United States Patent [19]

Petrofes et al.

[11] Patent Number: 5,150,916
[45] Date of Patent: Sep. 29, 1992

[54] MOTOR VEHICLE SUSPENSION WITH DAMPER HAVING ROTATABLE MEMBER OVERRUN DETECTION

[75] Inventors: James M. Petrofes, Tipp City; David A. Shal, Centerville, both of Ohio; Gary R. Denton, Erie, Pa.; David A. Hoptry, Grand Blanc, Mich.

[73] Assignee: General Motors Corporation, Detroit, Mich.

[21] Appl. No.: 746,644

[22] Filed: Aug. 15, 1991

[51] Int. Cl.⁵ ............................................. B60G 11/26
[52] U.S. Cl. .................................. 280/707; 280/714; 188/299; 188/319
[58] Field of Search ................. 280/707, 688, 714; 188/299, 319

[56] References Cited

U.S. PATENT DOCUMENTS

| | | | |
|---|---|---|---|
| 4,527,676 | 7/1985 | Emura et al. | 188/299 |
| 4,606,440 | 8/1986 | Buchanan, Jr. et al. | 188/319 |
| 4,620,619 | 11/1986 | Emura et al. | 188/319 |
| 4,890,858 | 2/1990 | Blankenship | 280/707 |
| 4,898,027 | 2/1990 | Morra | 280/707 |
| 4,900,054 | 2/1990 | Kessler | 280/688 |
| 4,909,536 | 3/1990 | Hale | 280/707 |
| 5,000,478 | 3/1991 | Kerastas | 280/707 |

Primary Examiner—Kenneth R. Rice
Attorney, Agent, or Firm—Robert M. Sigler

[57] ABSTRACT

A motor vehicle suspension system has a damper with a member rotatable through positions producing separate discrete damping characteristics. Feedback apparatus comprises a contact pad for each position, a brush rotating with the rotatable member, and an electric circuit generating an output voltage in a first voltage range when the brush does not contact a contact pad and in a second range when it does. The output voltage is repeatedly sampled to control a position count. An overrun detector responds to a predetermined change of the sampled output voltage from the second range to the first voltage range after deactivation of the motor at a selected contact pad to restart the motor so as to resume rotation of the rotatable member toward the selected contact pad.

2 Claims, 11 Drawing Sheets

MOTOR VEHICLE SUSPENSION WITH DAMPER HAVING ROTATABLE MEMBER OVERRUN DETECTION

BACKGROUND OF THE INVENTION

This invention relates to a motor vehicle suspension system of the type having a damper with a rotatable member providing different damping positions in different rotational positions, a motor to drive the rotatable member, a feedback apparatus for indicating the rotational position of the rotatable member and a control responsive to the feedback apparatus and other inputs for selecting a desired rotational position and controlling the motor to drive the rotatable element thereto. It particularly relates to such a system in which the rotatable member, motor and feedback apparatus are all included within the damper.

In such a suspension system, the feedback apparatus may comprise a plurality of contact pads, one for each position of the rotatable member and separated by insulating regions, and an electric circuit including a contact member moving over the contact pads so as to generate an output voltage in a first voltage range when the rotatable member is between the positions and a second voltage range when the rotatable member is in one of the positions. The apparatus may repeatedly sample the output voltage to detect changes therein between the voltage ranges. A counter may be incremented with each valid transition of the output voltage from the first voltage range to the second voltage range, with the count of the counter indicating the position of the rotatable member. Means may be provided for selecting one of the rotational positions and stopping the motor when the counter indicates the selected rotational position.

If the rotatable member has a comparatively large number of rotatable positions, such as eight, for example, each rotational position will subtend a comparatively small arc of a complete rotation of the rotatable member: for example, 15 degrees. Thus, even if the motor driving the rotatable member is stopped immediately upon detection of the desired rotational position, there is a chance of overrun past the valid range of the desired rotational position. It is desirable to detect such an overrun and restart the motor for another attempt at the desired rotational position.

SUMMARY OF THE INVENTION

Therefore, the motor vehicle suspension system of the invention comprises overrun detection means responsive to a predetermined change of the sampled output voltage from the second voltage range to the first voltage range after deactivation of the motor at the selected contact pad to restart the motor so as to resume rotation of the rotatable member toward the selected contact pad.

The overrun detection means may comprise first signal means activated by a first predetermined number of consecutive samples of the output voltage in the first voltage range and deactivated by a second predetermined number of samples of the output voltage in the second voltage range, second signal means activated by a sample of the output voltage in the first voltage range following the second predetermined number of samples of the output voltage in the second voltage range and deactivated by a sample of the output voltage in the second voltage range following the first predetermined number of consecutive samples of the output voltage in the first voltage range, and means for restarting the motor in response to a simultaneous activation of the first and second signal means after deactivation of the motor. Further details and advantages of this invention will be apparent from the accompanying drawings and following description of a preferred embodiment.

DESCRIPTION OF THE PREFERRED EMBODIMENT

Figure 1:
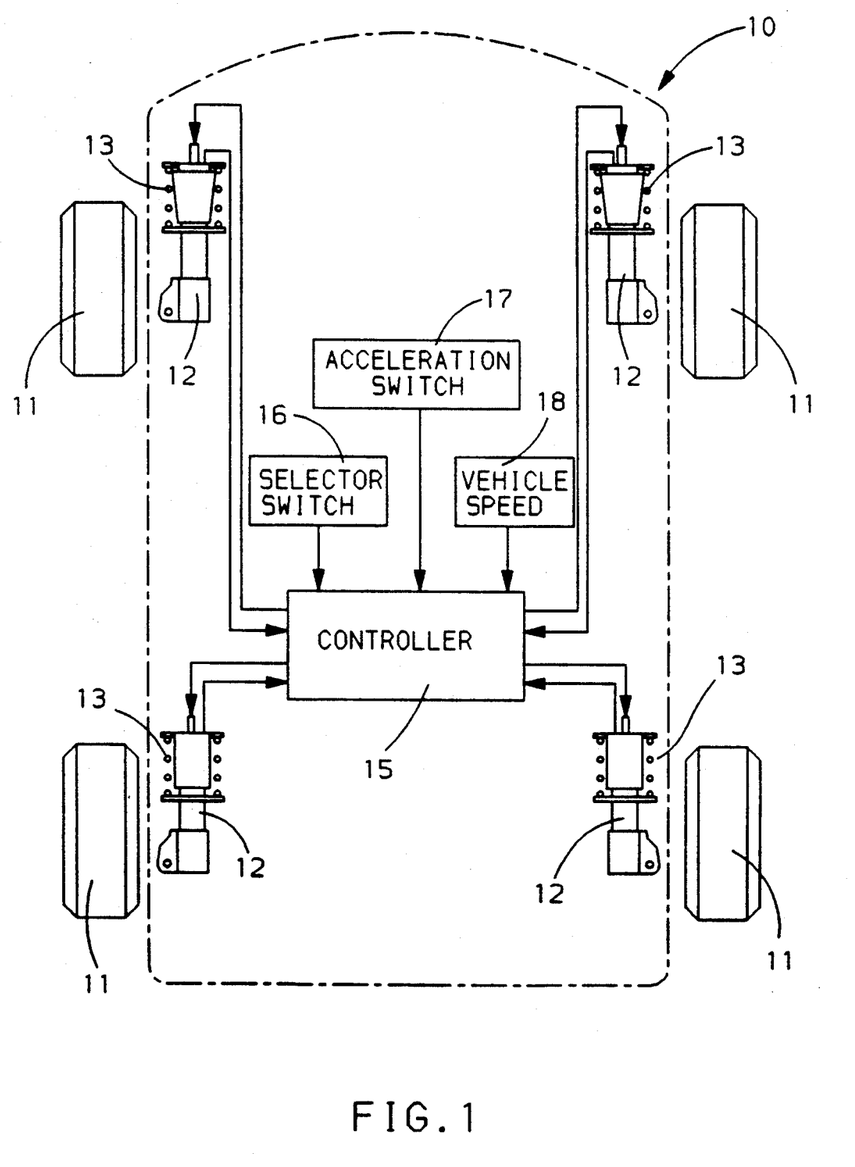
FIG. 1 is a schematic diagram of a vehicle suspension system according to the invention.

Referring to FIG. 1, a generally rectangular motor vehicle body 10 is supported on four wheels 11 by suspension apparatus comprising an adjustable damper 12 and a spring 13 at each wheel 11. One of the adjustable dampers 12 and one of the springs 13 is provided at each corner of vehicle body 10. Adjustable dampers 12, which will be described in greater detail below, are well known shock absorbers or struts having a selector valve with a member rotatable through a plurality of positions by an internal electric motor to produce different damping characteristics in various rotary positions. Adjustable dampers 12 each also include new internal feedback signal generating apparatus to signal the rotary position of the rotatable member.

A controller 15 provides driving power to the internal electric motors of adjustable dampers 12 and receives the position feedback signals therefrom. Controller 15 comprises an electric power source and a standard digital computer and may further receive digital or analog signals from vehicle parameter sensors such as a selector switch 16, an acceleration switch 17 and a vehicle speed sensor 18. Controller 15 also receives the feedback signals from dampers 12 as analog voltages and converts them to digital signals for internal use. The digital computer within controller 15 contains a stored control program in RAM or ROM which coordinates the reception of input signals from dampers 12 and sensors 16-18, processes a control algorithm using the inputs to derive desired damping characteristics and, therefrom, desired positions for the rotatable members in dampers 12 and outputs signals to drive the rotatable members within dampers 12 to the desired rotational positions to achieve the desired damping characteristics.

Figure 2:
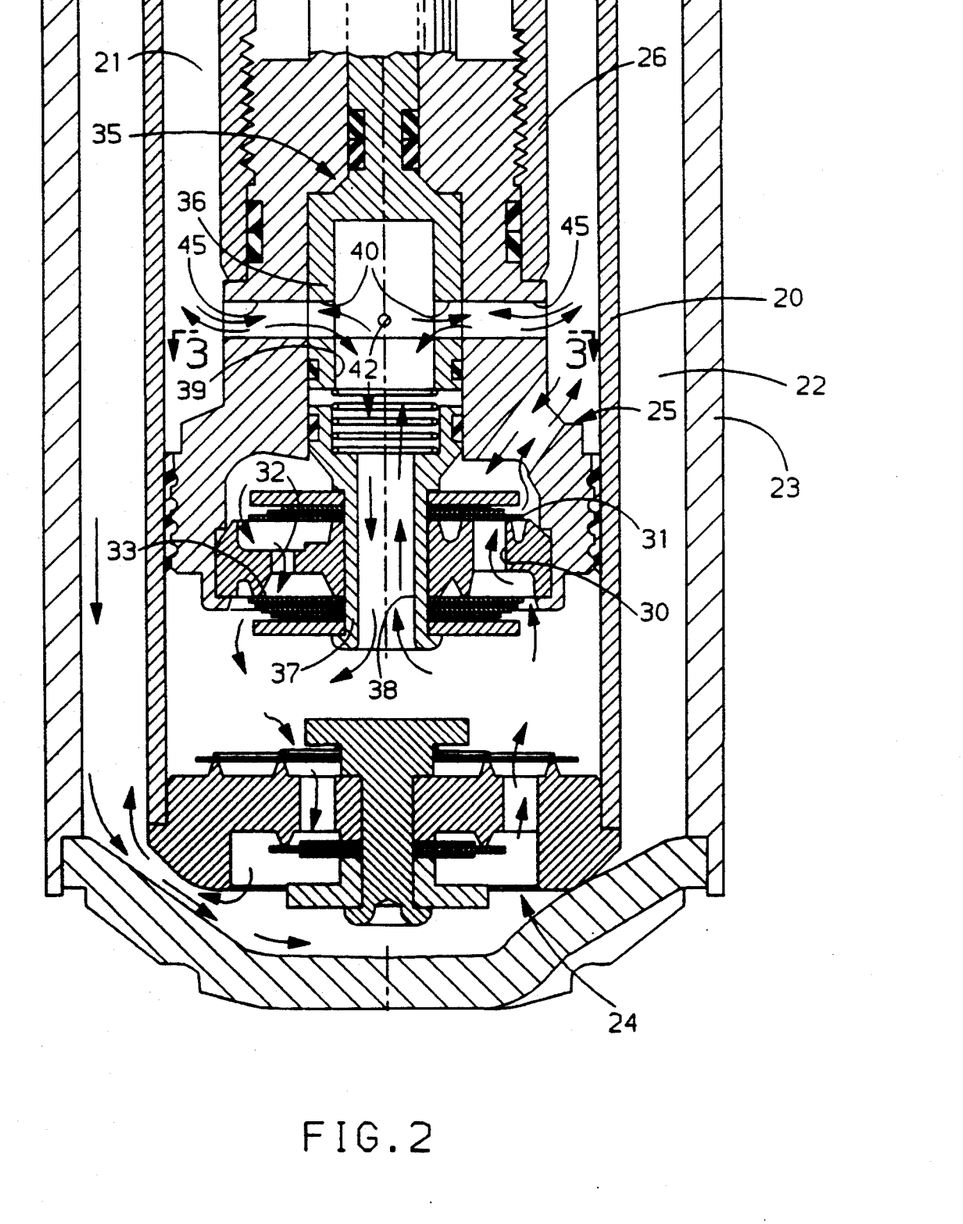
FIG. 2 is a partial cutaway view of an adjustable damper for use in the suspension system of FIG. 1.

FIG. 2 shows a partially cutaway view of a portion of one of adjustable dampers 12. Damper 12 has an elongated cylinder tube 20 having a conventional base valve assembly 24 which is secured in a lower end thereof to control the flow of fluid between an inner variable volume chamber 21 of the cylinder tube and a surrounding fluid reservoir 22 formed between cylinder tube 20 and an outer support tube 23. A valved piston and actuator assembly 25 with a connected piston rod assembly 26 are operatively mounted for linear stroking movement in cylinder tube 20 during damper operation in the usual manner. Valved piston and actuator assembly 25 includes a jounce passage 30 and jounce control valve member 31 for controlling fluid flow upward through assembly 25 into variable volume chamber 21 during downward movement of assembly 25 within cylinder tube 20 in the normal manner. Valved piston and actuator assembly 25 further includes a rebound passage 32 and rebound control valve member 33 for controlling fluid flow downward through assembly 25 out of variable volume chamber 21 during upward movement of assembly 25 within cylinder tube 20 in the normal manner. Jounce passage 30 is sized to provide a firm or "sport" damping characteristic during jounce motion of damper 12; and rebound passage 32 is similarly sized to provide a firm or "sport" ride characteristic during rebound movement of damper 12.

Valved piston and actuator assembly further includes a rotatable member 35 having a lower hollow cylindrical valve portion 36. rotatable member 35 extends upward in a shaft axially within piston rod assembly 26 to engage a rotary DC electric motor, not shown, which is also included physically within piston rod assembly 26. This electric motor is an actuating element effective when energized to turn rotatable member 35 within assembly 25. Valved piston and actuator assembly 25 includes a central annular bypass member 37 defining a bypass passage 38 into a hollow interior chamber 39 within cylindrical valve portion 36 of rotatable member 35.

Figures 3A, 3B, 3C:
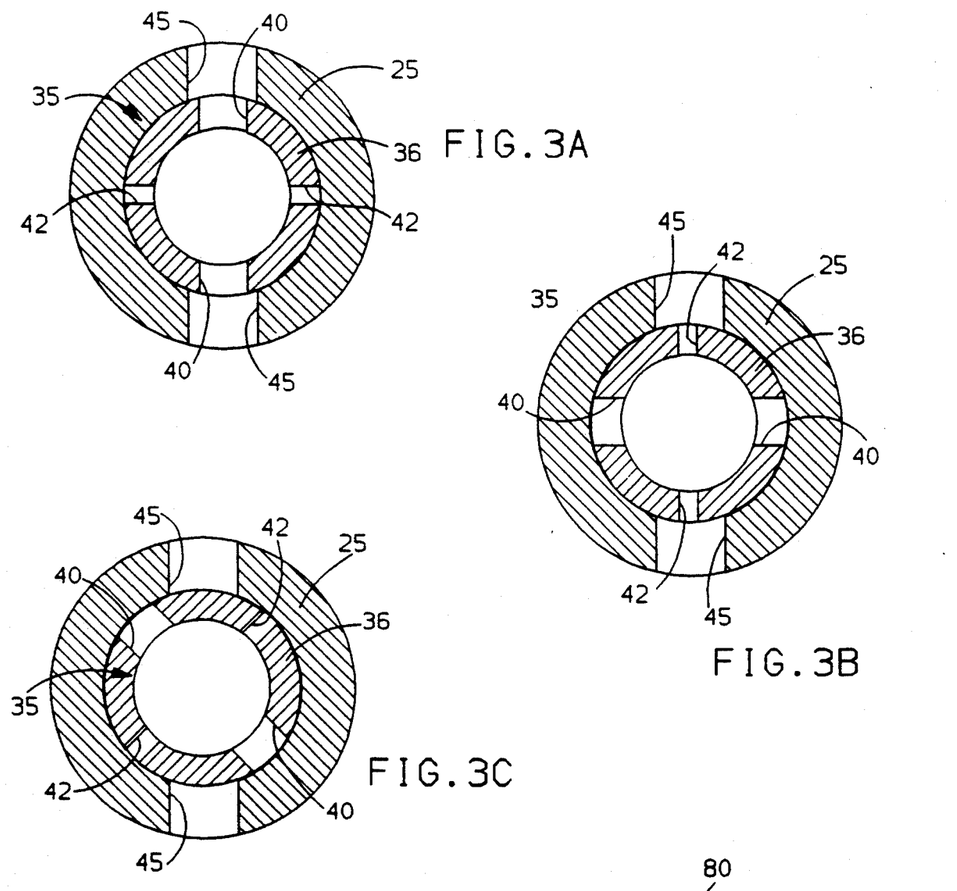
FIGS. 3A, 3B and 3C are section views along lines 3—3 of FIG. 2 illustrating different rotational positions of a rotatable member as shown.

Referring to FIGS. 3A-3C, cylindrical valve portion 36 of rotatable member 35 is provided with a diametrically opposed pair of radial openings 40 and another diametrically opposed pair of radial openings 42 offset 90 degrees from the first pair of openings 40. Openings 42 are of smaller diameter than openings 40; and all openings 40 and 42 may be disposed around cylindrical valve portion 36 at the same axial level so as to register in predetermined rotational positions of rotatable member 35 with diametrically opposed flow passages 45 in valved piston and actuator assembly 25. In a home position of rotatable member 35, as shown in FIG. 3A, for example, openings 40 register with openings 45 and thus communicate interior chamber 39 with variable volume chamber 21. Openings 40 and 45 thus provide a bypass passage in parallel with jounce passage 30 and rebound passage 32 to increase flow through valved piston and actuator assembly 25 with movement thereof to produce a soft "comfort" damper characteristic. Openings 45 are larger in diameter than openings 40, so that openings 40 provide the controlling orifice size.

Another rotational position of rotatable member 35, as shown in FIG. 3B, finds rotatable member 35 rotated 90 degrees from the position shown in FIG. 3A, so that the smaller diameter openings 42 are registered with openings 45. This produces a smaller bypass flow through valved piston and actuator assembly 25 for a "normal" damper characteristic. Rotational positions 180 degrees from those shown in FIGS. 3A and 3B, respectively, are indistinguishable therefrom in the apparatus shown. FIG. 3C shows rotatable member 35 rotated 45 degrees from any of the other positions so as to block openings 45. In these positions, there is no significant bypass fluid flow through valved piston and actuator assembly 25; and the firm or "sport" damping characteristic is obtained as previously described.

Thus, the apparatus provides eight distinguishable positions of rotatable member 35 through a complete revolution thereof. The motor drives rotatable member 35 in a single direction and may be stopped in any of the eight positions, 45 degrees apart, to produce damping characteristics in the following order, starting with the home position: comfort, sport, normal, sport, comfort, sport, normal, and sport. These positions of rotatable member 35 will be referred to by number as positions 0-7, starting with the home position. Thus, rotatable member 35 is never more than a single 45 degree rotation away from an odd numbered position producing the firmest, or "sport", damping characteristics in unidirectional rotation. This is helpful in quick response to vehicle acceleration signals.

Figure 4:
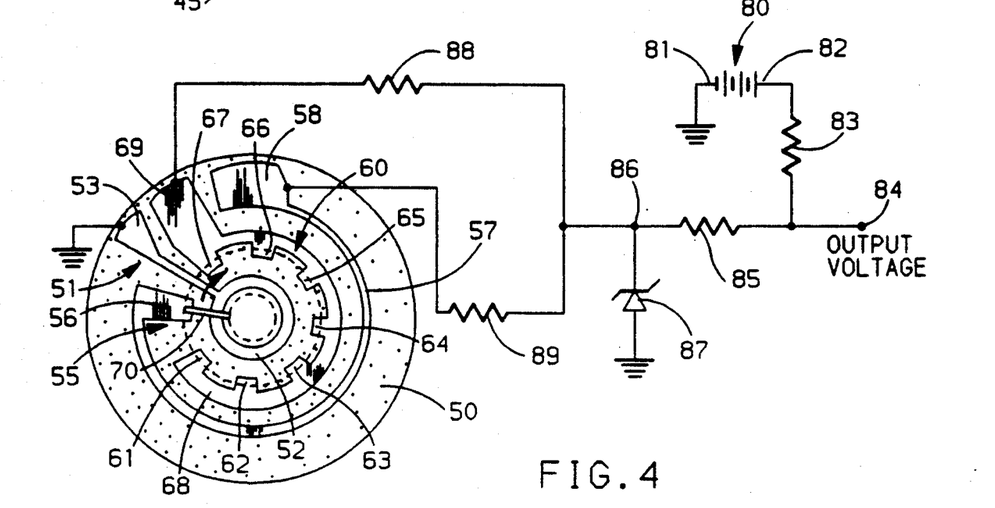
FIG. 4 is a schematic view of an internal position feedback signal generator for the adjustable damper of FIG. 2.

Position feedback apparatus for rotatable member 35 is shown in FIG. 4. A disk 50, made of an electrically insulating material, is contained within cylindrical tube 20 adjacent the motor which drives rotatable member 35. Disk 50 is restrained from rotation and has deposited on a face thereof a plurality of electrically conductive contacts. A common contact 51 comprises a circular portion 52 and a terminal portion 53 extending radially outward therefrom. A home contact 55 comprises a contact pad 56 and a circular connector portion 57 extending circularly around disk 50 to a terminal portion 58. Finally, a multi-pad contact 60 comprises a plurality of contact pads 61-66 connected by a circular connector portion 68 to a contact pad 67 and a terminal portion 69 formed integrally therewith.

Contact pads 56, 61, 62, 63, 64, 65, 66 and 67 are disposed circularly around disk 50 at a common diameter outside that of circular portion 52 of common contact 51. Contact pad 56 extends radially outward farther than the other contact pads 61-67 so that it joins circular portion 57 at a larger radius than that of circular portion 68 connecting contact pads 61-67 and thus maintain contact pad 56 electrically insulated from contact pads 61-67. A moving electric contact member or brush 70 is biased against disk 50 and extends radially to cover simultaneously circular portion 52 of common contact 51 and a common radius of the contact pads 56 and 61-67 but not so far as to contact circular connector portion 68. The contact pads are spaced with centers 45 degrees apart and with insulating regions of disk 50 between each pair of adjacent contact pads. Brush 70 is engaged with rotatable member 35 for rotation therewith about the center of disk 50 so that it bridges contact pad 56 of home contact to common contact 51 in the home or zero position of rotatable member 35 and likewise bridges each of contact pads 61-67 in order to common contact 51 in each of the other seven previously described positions 1-7 of rotatable member 35. The insulating region between each pair of contact pads corresponds to a position of rotatable member 35 between two of the positions numbered 0-7 and provides no electrical contact between common contact 51 and either of home contact 55 or multi-pad contact 60. Each of the contact pads comprises a 15 degree arc, with the intervening insulating portions comprising a 30 degree arc.

A source of electric power such as battery 80 has a grounded terminal 81 and a power terminal 82 connected through a resistor 83 (2.2 K) to an output terminal 84. A regulated DC voltage of 5.0 volts is available at the power terminal 82. Battery 80 represents a regulated DC power supply, the details of which are not shown, since many such supplies exist in the prior art. Output terminal 84 is connected through a resistor 85 (220 ohm) to a junction 86, from which a 5.6 volt zener diode 87 is connected to ground. Junction 86 is also connected through a resistor 88 (330 ohm) to terminal portion 69 of multi-pad contact 60 and through a resistor 89 (2.8 K) to terminal portion 58 of home contact 55.

When rotatable member 35 is between positions and brush 70 does not contact contact pad 56 or any of contact pads 61-67, junction 86 is not grounded through either of resistors 88 or 89. Since zener diode 87 has a higher breakdown voltage than the voltage on terminal 82 of power source 80, some voltage under but close to 5.0 volts appears as the output voltage on output terminal 84. If terminal 84 feeds a high impedance load, the output voltage can be kept close to 5.0 volts. When rotatable member 35 is in the home position and brush 70 grounds contact pad 56, as shown in FIG. 4, junction 86 is grounded through resistor 89 and home contact pad 55. A voltage divider of resistors 83, 85 and 89 thus provides an output voltage somewhere near 3 volts on terminal 84, the precise voltage depending on the exact resistances of the resistors within their tolerances. Similarly, when rotatable member 35 is in any of its other rotational positions, junction 86 is grounded through resistor 88 and multi-pad contact 60. A different voltage divider comprising resistors 83, 85 and 88 produces an output voltage on terminal 84 somewhere near 1 volt. The output voltage appearing on output terminal 84 is an analog voltage comprising the feedback signal provided to controller 15. It may be considered to have a value within three ranges signifying the three defined conditions of rotatable member 35: greater than 3.5 volts to indicate between positions; between 2.0 and 3.5 volts to indicate home position; and below 2.0 volts to indicate any other rotational position. It is provided to an analog input of controller 15 and A/D converted so that the digital computer apparatus of controller 15 may compare it with reference voltages defining the voltage ranges described above.

Figure 5:
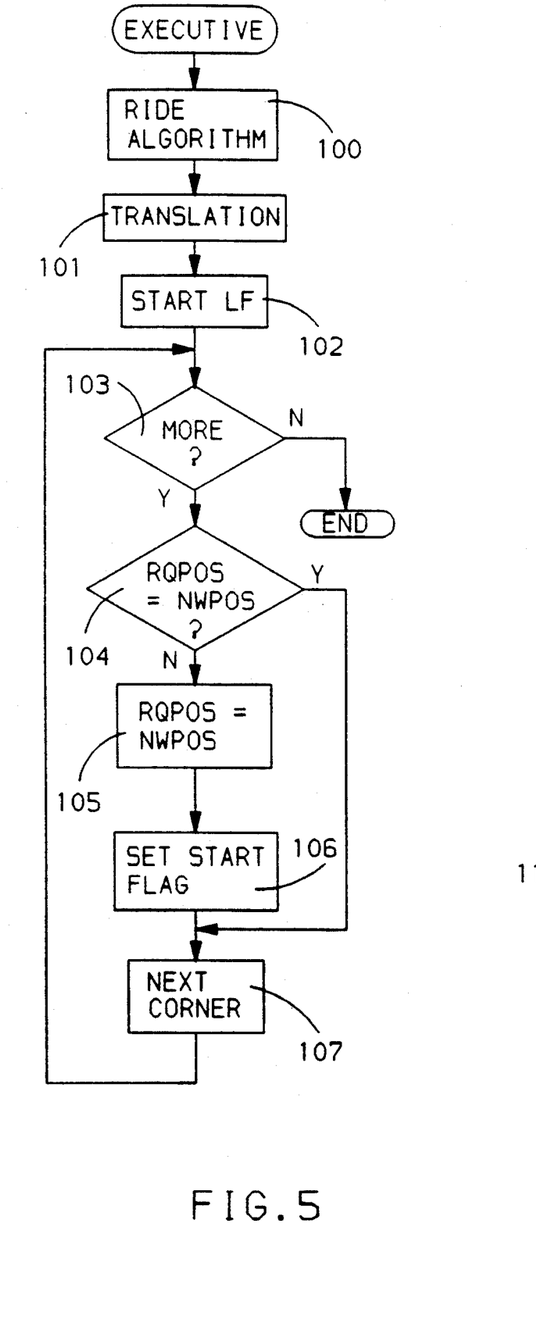
FIGS. 5-13 are flow charts describing the operation of the suspension system according to the invention.

The stored program of controller 15 is shown in flow chart form in FIGS. 5 through 13. FIG. 5 shows the relevant portion of a main or EXECUTIVE routine which runs continuously and repeatedly except when interrupted. The EXECUTIVE routine begins with a RIDE ALGORITHM portion or subroutine 100, which will not be described in detail, since its precise nature is unimportant to this invention. It is sufficient to note that RIDE ALGORITHM 100 determines a desired ride characteristic from one or more vehicle ride related parameters and that the desired ride characteristic is expressed as one of three shock settings: COMFORT, NORMAL and SPORT. For example, various vehicle speed ranges, as indicated by vehicle speed sensor 18, may normally call for COMFORT, NORMAL OR SPORT ride characteristics. Sensed vehicle acceleration from switch 17, which indicates speed increase, braking or turning, as indicated by acceleration direction, may call for SPORT or firm ride to reduce vehicle body roll or dive. Driver selection may be provided through selector switch 16. Many such algorithms are known in the prior art.

The output of RIDE ALGORITHM 100 is passed to a TRANSLATION subroutine 101 in which it is converted to an absolute rotational position of rotatable member 35. TRANSLATION subroutine 101, shown in FIG. 7, will be described at a later point in this description. It is desirable, for diagnostic purposes, that all four dampers be driven to the same absolute position, even though each of the ride characteristics may be obtained in more than one of the absolute rotational positions. The EXECUTIVE routine therefore next determines, for each corner, whether the damper at that corner needs to be changed. Starting with the left front corner, the routine establishes a corner index number at step 102 and compares this with a reference at decision point 104 to determine if there is a corner to be processed. Next, at decision point 104, the translated new desired position for all corners, NWPOS, is compared with the last desired position RQPOS for this corner. If they are the same, the corner index number is incremented for the next corner at step 107; and the routine returns to decision point 103 to check whether the new corner index number represents another valid corner to process. If NWPOS and RQPOS are not the same, however, the rotatable member 35 of the damper at this corner needs to be driven to the new desired position NWPOS. Therefore, before proceeding to step 107, the routine replaces the old value of RQPOS with NWPOS at step 105; and a START flag for the corner is set at step 106. When the corner index number is finally determined to be out of range for a valid corner at decision point 103, there are no further corners to be checked. Therefore, the EXECUTIVE routine is ended and begun again.

Figure 6:
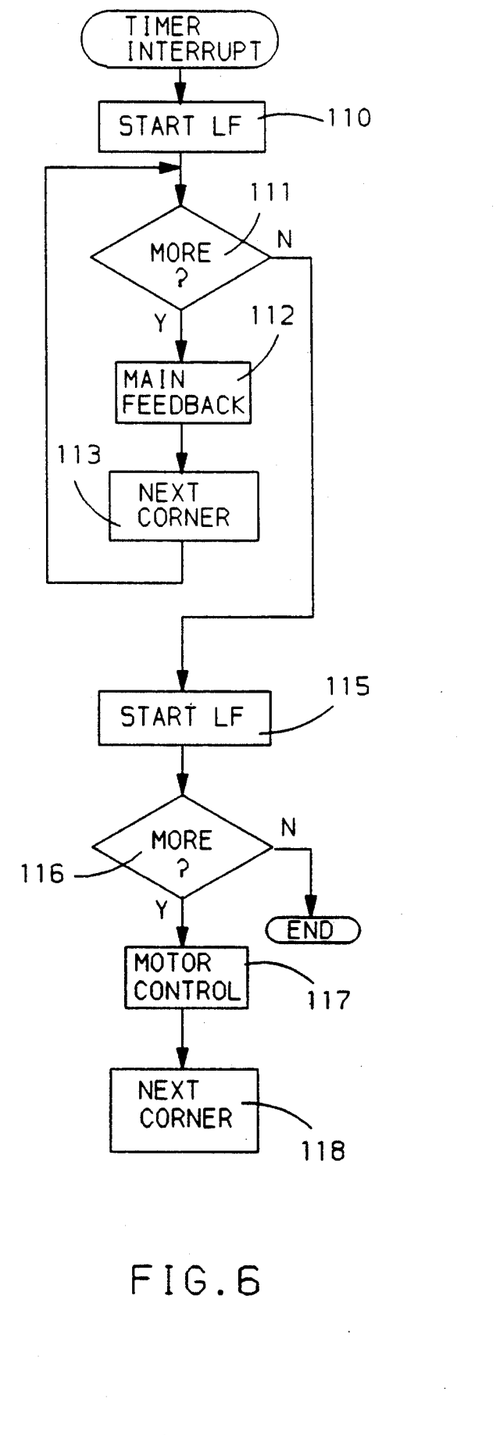

The stored program also includes a clock based timer interrupt which interrupts the EXECUTIVE routine every 2.5 milliseconds to run a TIMER INTERRUPT routine as shown in FIG. 6. This routine essentially handles the feedback processing for each corner and the motor control for each corner. The TIMER INTERRUPT routine of FIG. 6 begins with the left front corner at step 110 and runs a MAIN FEEDBACK subroutine 112 once for each corner, as determined by decision point 111 and step 113. The routine then begins again with the left front corner and similarly runs a MOTOR CONTROL subroutine 117 once for each corner as determined by decision point 116 and step 118. When there are no more corners, the routine is ended and the EXECUTIVE routine resumed until the next timer interrupt.

Figure 7:
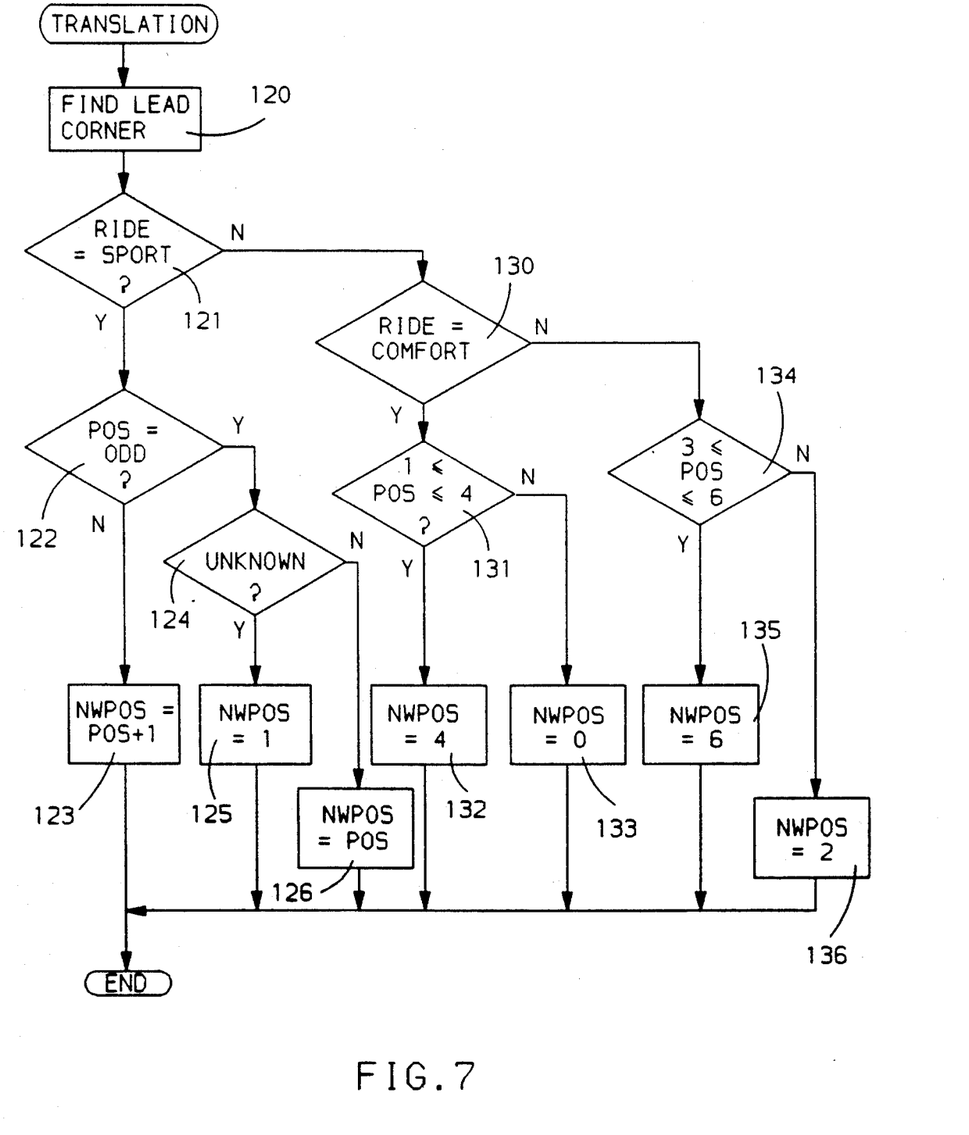

The TRANSLATION subroutine 101, shown in FIG. 7, derives a variable NWPOS, which indicates the new desired rotational position for all corners. NWPOS is preferably an integer count stored in three bits of an eight bit byte at a predetermined memory location. Integer values 0-7 (binary 000 to 111) indicating rotational positions of rotary member 35 are assigned to the eight actuator positions. In order to derive NWPOS, the subroutine first finds a lead corner at step 120. This process comprises starting with a predetermined corner, such as the left front, and determining whether certain error flags or counters, which will be described at a later point, indicate a sensed current error condition. The program assigns the first corner with no error condition, or the last if all have errors, as the lead corner. Next, it is determined at decision point 121 whether or not the new desired ride characteristic variable RIDE (output of the RIDE ALGORITHM)=SPORT. If it is, the subroutine examines a present rotational position POS of the chosen lead corner. There is a local variable POS for each corner; and it uses three bits to indicate the actual rotational position at that corner in the same binary code as that used for NWPOS described above. At decision point 122, it is determined if the value of POS for the chosen lead corner is odd—that is, a SPORT position. If it is not, then NWPOS—POS+1 is calculated at step 123 for the next SPORT position. If POS is odd, however, the subroutine determine a further bit of information. The value of POS is actually a count in a counter which is updated in response to the feedback signal of the damper 12. Allowance is made for the possibility that the actual position may be recognized by the controller as being unknown at a particular time. A fourth bit of the eight bit byte comprising POS is set (along with 1's in the other three bits) to indicate position unknown. Therefore, at decision point 124 the subroutine determines if POS is 15, the number indicating position unknown. If so, NWPOS is set to 1 at step 125. If the position is unknown, the home position must be sensed before the position can be known again; and "1" is the first "sport" position past the home position. If POS is odd but not 15—that is, a known SPORT position—there is no need to change it for the lead corner. However, NWPOS is made equal to POS at step 126 so that any of the other corners not at the same position will be driven to the same "sport" position.

From decision point 121, if RIDE does not=SPORT, decision point 130 determines if RIDE=COMFORT. If it is, decision point 131 determines whether POS is 1–4 inclusive. If so, NWPOS is set at step 132 to the next available COMFORT position 4. If not, NWPOS is set to the next available COMFORT position 0, the home position. If RIDE does not equal either SPORT or COMFORT, it must=NORMAL. Thus, decision point 134 determines whether POS is 3–6 inclusive. If so, NWPOS is set at step 135 to the next available NORMAL position 6. If not, it is set at step 136 to 2. Once NWPOS is derived for the lead corner, all four corners will be driven to the same position.

Figure 8:
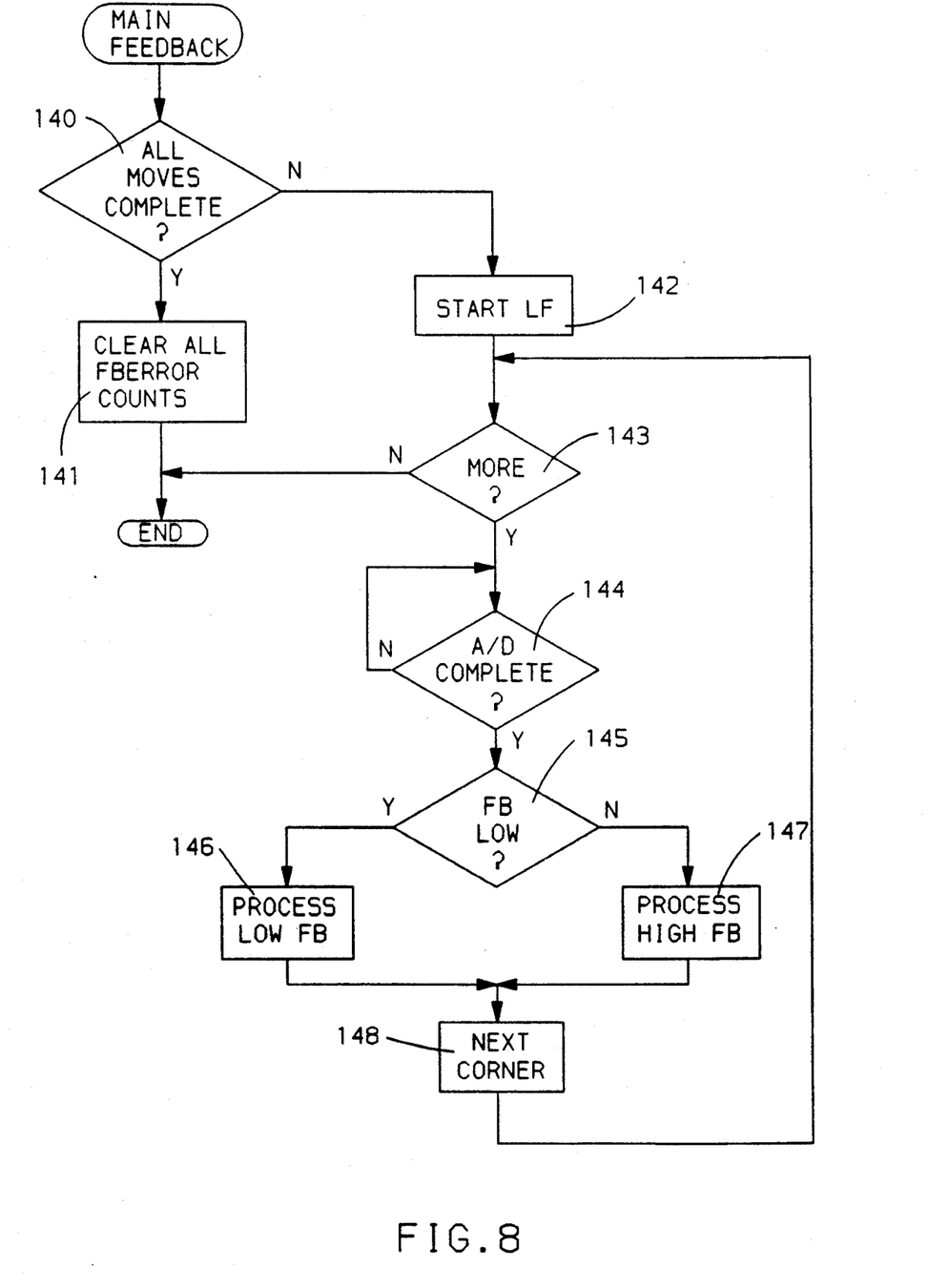

The MAIN FEEDBACK subroutine is described in FIG. 8. Decision point 140 determines if all moves are complete—that is, if all dampers have achieved their desired positions. If so, all feedback error counters are cleared at step 141 and the feedback routine is ended. If not, however, a feedback signal is desired; and the subroutine examines the feedback signals from all four corners starting with the left front corner at step 142. For the first corner, the program will pass through decision point 143, which determines if there are more corners to process, and will loop around decision block 144 until the analog to digital (A/D) conversion of the left front feedback voltage is complete. When this process is complete, the program determines at decision point 145 if the digital representation (FB) of the feedback signal is low. That is, the binary number FB representing the feedback signal is compared with a reference number representing 3.5 volts, which defines (with the 5.0 volt regulated DC supply voltage of the computer of controller 15) a first voltage range indicating between positions. If FB is lower than the 3.5 volt reference, the program calls the PROCESS LOW FB subroutine 146 before selecting the next corner at step 148. If FB is equal to or greater than the 3.5 volt reference, the program calls the PROCESS HIGH FB subroutine 147 before selecting the next corner at step 148. From step 148, the program returns to decision point 143 and eventually ends when all corners have been processed.

Figure 9:
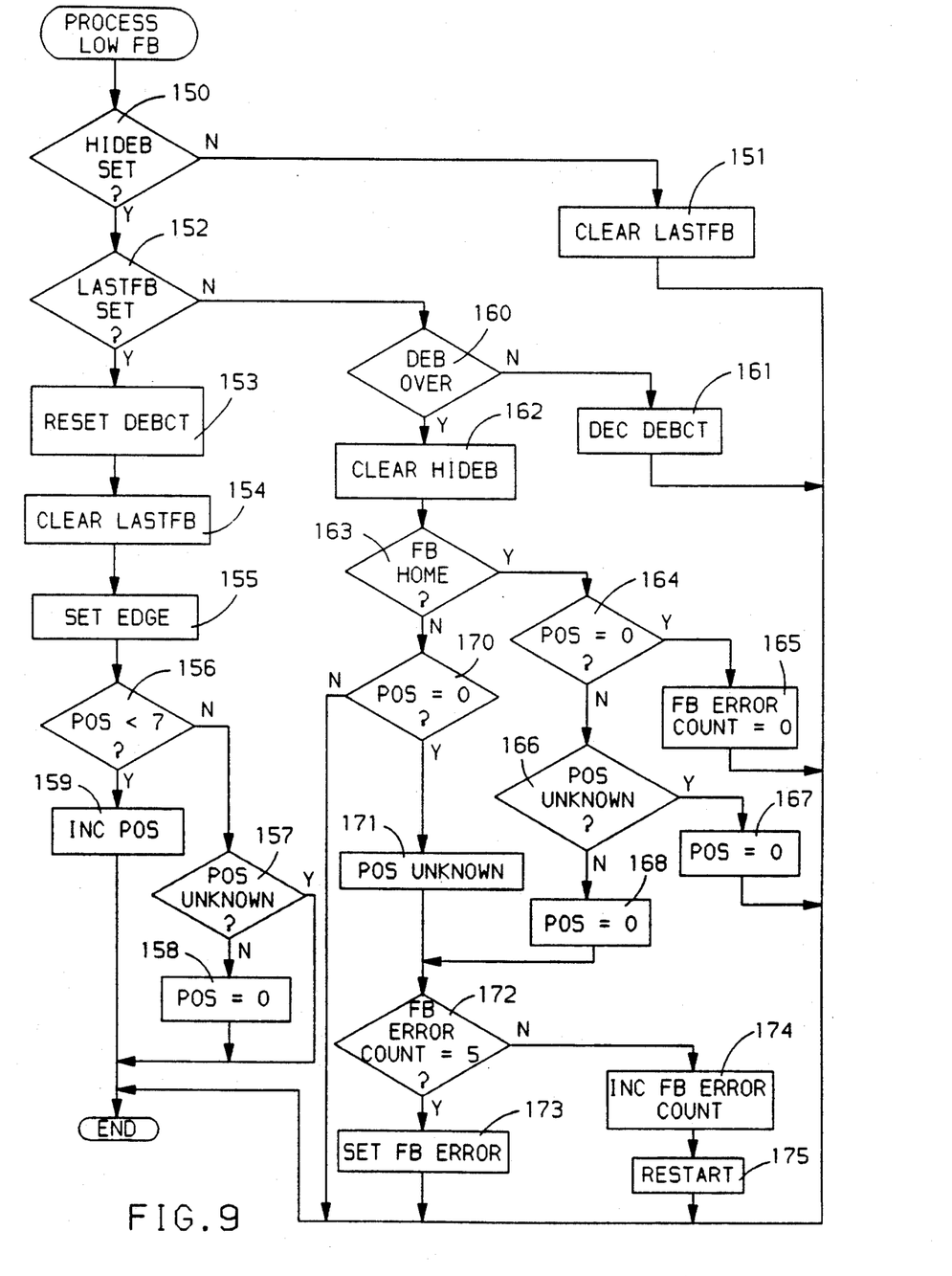

The PROCESS LOW FB subroutine is described in FIG. 9. At decision point 150, it is determined whether the HIDEB flag is set. This flag indicates that the FB signal has been debounced high and has not yet been debounced low, even though one or more low FB signals may have been received, since a predetermined number of consecutive low FB signals are required for low debounce. If the HIDEB flag is not set, the FB signal is already debounced low; and a LASTFB flag, which will be described at a later point, is cleared at step 151 before the subroutine ends. If the HIDEB flag is set, however, the subroutine determines at decision point 152 if the LASTFB flag is set. If the answer is yes, a debounce count DEBCT is reset at step 153, the LASTFB flag is cleared at step 154, and an EDGE flag is se at step 155. The EDGE flag indicates that the FB signal has just gone low for the first time since being debounced high and that this is therefore the beginning of a new actuator position. The EDGE flag is used by the MOTOR CONTROL subroutine yet to be described and is only set in this subroutine.

Once the beginning of a new contact pad (56, 61–67) has been encountered by brush 70, it is important to determine the new actuator position and begin the actuator stopping process immediately, so that the actuator may be stopped within the 15 degree rotation of the actuator if the desired position NWPOS has been reached. Therefore, from step 155, the subroutine first determines at decision point 156 if the contents POS of a position counter for this corner is less than 7. This counter is preferably an integer count stored in four bits of an eight bit byte at a predetermined memory location, with the four bits assigned for the position number as previously described with reference to FIG. 7. The other four bits of the byte may be used for various flags for this corner, such as HIDEB, LASTFB and EDGE. If POS is not less than decimal 7, it must be either 7 (binary 1110) or unknown (15 or binary 1111). At decision point 157, it is determined which of these is the case. If the position is marked as unknown (POS=15), the subroutine ends, since it makes no sense to increment an unknown position. If POS is equal to 7, however, it is rolled over to zero at step 158 before the subroutine ends. If POS is less than 7, it is incremented in step 159 before the subroutine ends. Thus, even before low debouncing of the FB signal is complete, the EDGE flag and position count POS for the corner are set up for use by the MOTOR CONTROL subroutine in stopping the motor.

From decision point 152, if the LASTFB flag is not set, the subroutine determines, at decision point 160, if low debounce is completed. This is determined by examining the contents DEBCT of the debounce counter reset to a predetermined number (such as 3) at step 153. If DEBCT does not equal zero, it is decremented at step 161 before the subroutine ends. If it has been decremented to zero, however, the FB signal has been debounced low; and the HIDEB flag is cleared at step 162 to indicate this fact. The low FB signal indicates that the actuator has reached a valid position. However, this position could be the home position indicated by a feedback voltage in a range between 2.0 and 3.5 volts or one of the other seven positions indicated by a feedback voltage in a range below 2.0 volts. Thus, at decision point 163, the subroutine compares signal FB with predetermined references to determine whether it indicates home position of the actuator. If it is home, the subroutine checks the position count POS, at decision point 164, to see if it agrees (POS=0). If it does, a FB ERROR count is cleared to zero at step 165 before the subroutine is ended. If there is disagreement, however (POS not=0), the subroutine determines at decision point 166 if the position had been unknown. If so, the position is now known to be zero; and POS is set equal to zero at step 167 before the subroutine ends. If the position count did not indicate that the position was unknown, then an error is indicated. The position count is set equal to zero at step 168; but, before the subroutine ends, it processes the error.

Before describing the error processing, this description returns to decision point 163. If the FB signal does not indicate an actuator home position, the actuator must be in one of the other seven positions. The subroutine checks this result against the position count POS at decision point 170 to ensure that POS is not zero. If it is not, the subroutine ends. However, if it is, an error has occurred. The POS count is set to indicate position unknown at step 171; and the subroutine proceeds to the error processing. From either of steps 168 or 171, the subroutine determines at decision point 172 if the FB ERROR count equals a predetermined reference such as 5. If so, the FB ERROR flag is set at step 173 before the subroutine is ended. If not, however, the FB ERROR count is incremented at step 174 and a RESTART flag is set at step 175 before the subroutine is ended. Thus, this error must occur five times before the FB ERROR flag is set.

Figure 10:
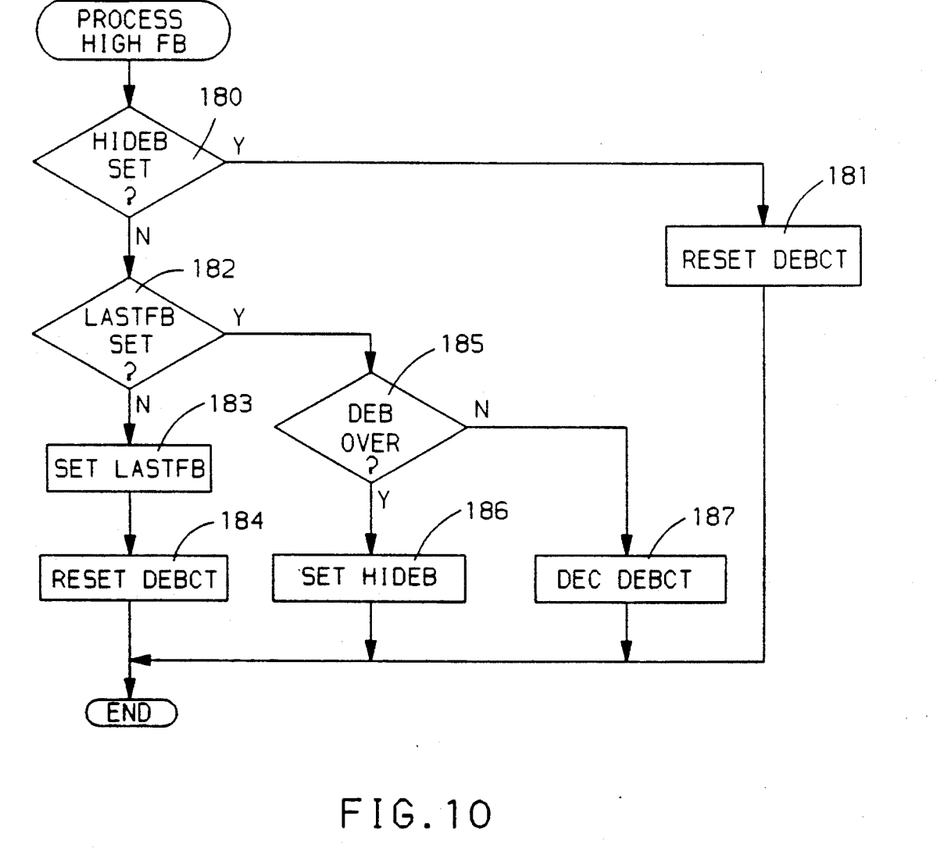

The PROCESS HIGH FB subroutine is shown in FIG. 10. The subroutine first determines at decision point 180 if the HIDEB flag for the corner is set. If it is, DEBCT is reset at step 181 before the subroutine ends. If the HIDEB flag is not set, the subroutine determines at decision point 182 if the LASTFB flag is set. If it is not set, it is set high at step 183 and DEBCT is reset at step 184 before the subroutine ends. If it is set, however, the subroutine next determines at decision point 185 if the debounce period is over, as in the PROCESS LOW FB subroutine by checking to see if the count has been decremented to zero. If the debounce period is not over, DEBCT is decremented in step 187 before the subroutine is ended. If the debounce period is over, the FB signal has been debounced high; and the HIDEB flag is thus set in step 186 before the subroutine ends.

The LASTFB flag used in the PROCESS LOW FB subroutine of FIG. 9 and the PROCESS HIGH FB subroutine of FIG. 10 has an important function which will now be described in detail. An examination of the flow charts of FIGS. 9 and 10 shows that the LASTFB flag can is only set (step 183, FIG. 10) when a high feedback signal is received with the feedback signal debounced low. Although it may be reset and set a few times during the high debounce process as brush 70 leaves a contact pad, it will be set as the high debounce is completed and will then stay set, due to decision point 180, as long as the feedback signal remains high, with brush 70 between contact pads. As brush 70 first touches the next contact pad, the feedback signal goes low; and the LASTFB flag is cleared in step 154 as the EDGE flag is set in step 155 and the new position count POS is determined at 156-159. As the feedback signal is being debounced low, decision points 152 of FIG. 9 and 180 of FIG. 10 prevent the LASTFB flag from being set. Once the feedback signal is debounced low, decision point 150 prevents the LASTFB flag from being set until the first high feedback signal is received.

Once a new position has been recognized by the setting of the EDGE flag and the incrementing of the position count POS, the LASTFB flag, at decision point 152, prevents the EDGE flag from being set and the position count POS from being changed again until the feedback signal goes through another full debounce cycle of low and high. Thus, although the control must respond immediately—before low debounce is complete—to the first low feedback signal after a high debounce condition is established in order to stop on a contact pad, it is prevented from falsely signaling a non-existent new position in response to contact bounce at the beginning of the contact pad or to momentary loss of contact due to dirt, etc. while brush 70 rides over the contact pad.

Figure 11:
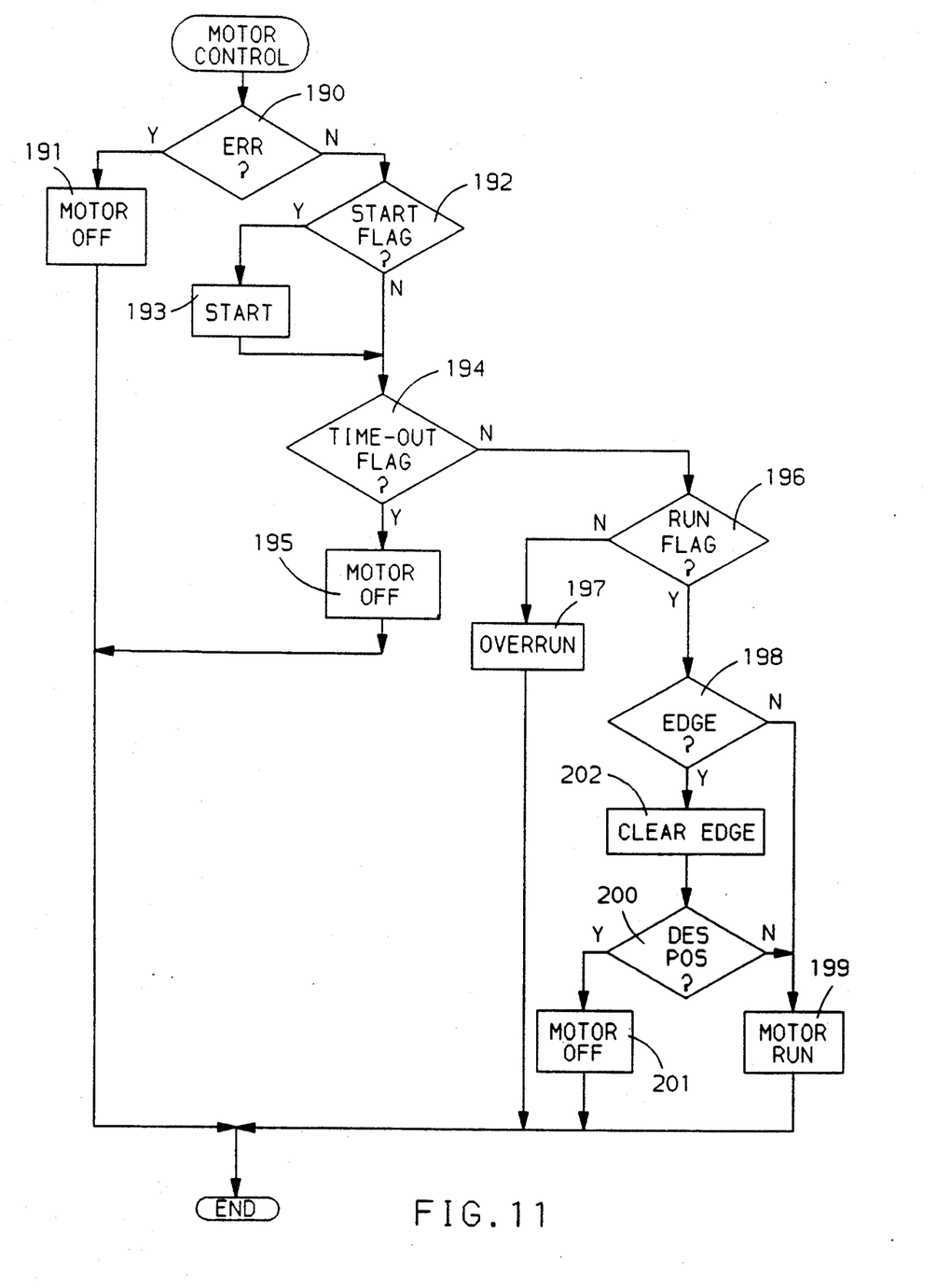

The MOTOR CONTROL subroutine is shown in FIG. 11. At decision point 190, the subroutine first checks a number of error flags to see if a flagged error condition exists. These flags may include: (a) a TIME-OUT ERROR, which is flagged when a predetermined long time has elapsed without a corner arriving at the desired position; (b) a BUDGET CURRENT ERROR, in which the total current draw for all motors in the system is greater than a predetermined maximum; (c) a CORNER CURRENT ERROR, in which the current draw for a single corner exceeds a predetermined maximum; (d) an OVERRUN ERROR, in which an actuator has overrun its desired position; or (e) a feedback or FB ERROR, in which an error condition has repeatedly occurred in the feedback signal. If any of these errors are flagged, the motor is turned off at step 191. Besides turning off the motor drive, the motor turn-off process of step 191 includes clearing RUN and START flags for the corner before the subroutine is ended. A subroutine may also be called, whenever the motor is stopped, to apply and control dynamic braking.

If no flagged error condition exists, the subroutine determines at decision point 192 if the START flag is set. If it is set, a start condition for the motor is indicated; and a START subroutine 193 is called before the MOTOR CONTROL subroutine is continued. The START subroutine, which will be described with reference to FIG. 12, controls certain functions associated with starting the motor. The MOTOR CONTROL subroutine continues at decision point 194 by checking a TIME-OUT flag. If it is set, the motor is turned off at step 195, in a process that includes clearing the RUN flag and an OVERRUN counter and, if the motor is on, setting a TIME-OUT ERROR flag and turning off the motor drive. The subroutine then ends.

Figure 13:
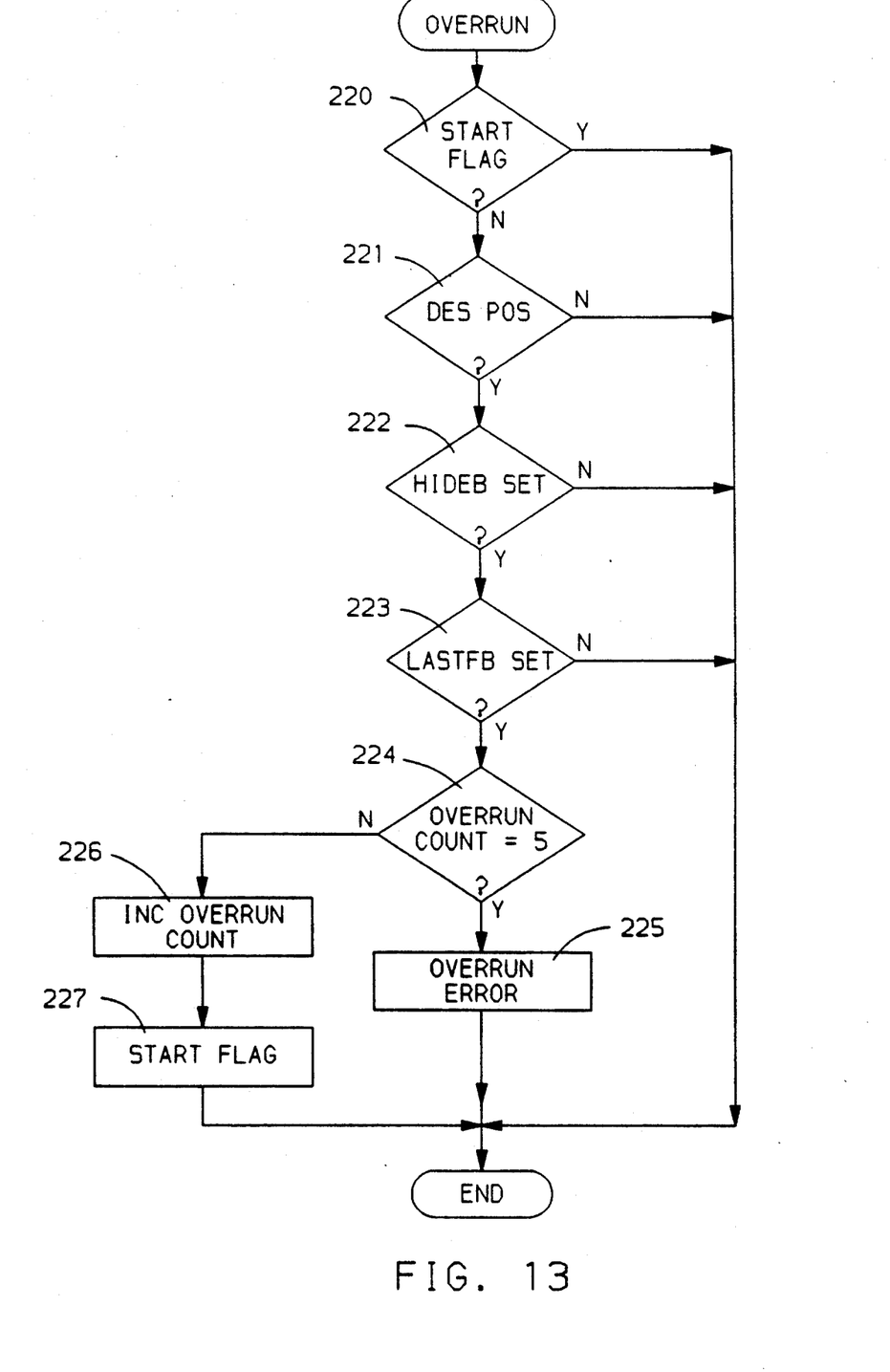

If the TIME-OUT flag is not set at decision point 194, the RUN flag is checked at decision point 196. If it is not set, an OVERRUN subroutine 197, described with reference to FIG. 13, is called and the subroutine then ended. If it is set, the subroutine next determines, at decision point 198, if the EDGE flag is set. If it is not, the motor RUN flag is set at step 199 and the subroutine ended. However, if it is set, the actuator is assumed to have reached a new position indicated by the position count POS for the corner. Thus, after clearing the EDGE flag in step 202, the subroutine next checks the position count POS at decision point 200 to determine if it equals the desired position NWPOS. If it does not, the subroutine proceeds to step 199. However, if it does, the subroutine turns the motor off at step 201, in a process that includes turning off the motor drive and clearing the RUN flag, before the subroutine ends.

Figure 12:
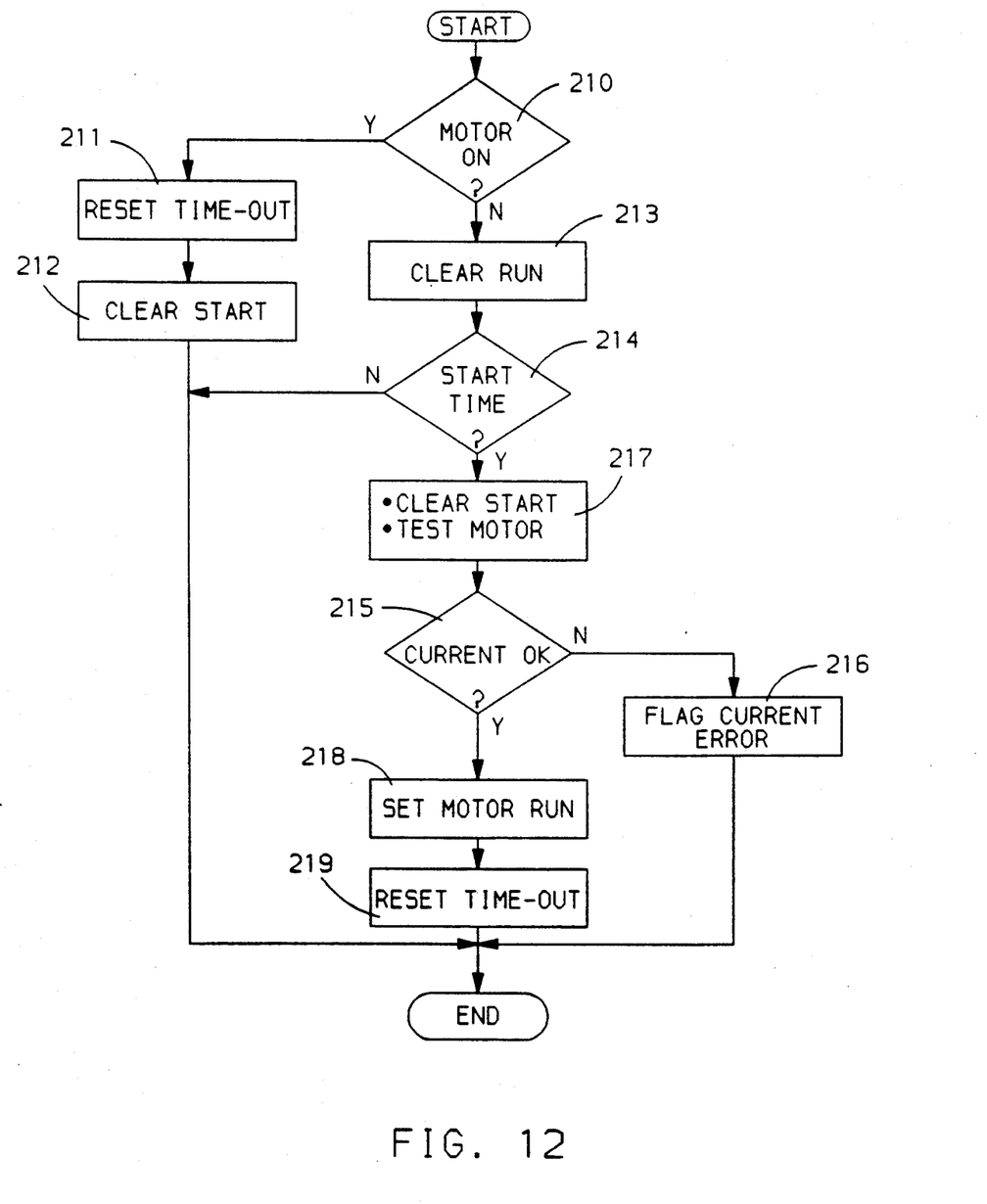

The START subroutine is shown in FIG. 12. It first determines, at decision point 210, if the motor drive is on. If so, it does not need to be started. A TIME-OUT timer is set for 6 seconds at step 211 and the START flag is cleared at step 212 before the subroutine ends. If the motor drive is not on, the RUN flag is cleared at step 213. The subroutine then determines, at decision point 214, whether it is time to start this motor. In order to minimize the chance of excess current draw, the motors are stagger started, with the start of any motor delayed for a predetermined period after the start of another motor to avoid the initial period of high motor starting current. If it is still too soon after the start of another motor, the subroutine ends. However, if a sufficient time has passed, the START flag is cleared and the motor is current tested at step 217. The process of current testing includes turning on the motor drive for a short current test period of 1 millisecond and checking the motor current at this corner during the current test period. If there is an overcurrent condition at decision point 215, the CORNER CURRENT ERROR flag is set at step 216 and the subroutine ended. If there is no current error, the motor run flag is set at step 218 to start the motor toward the desired position; and the TIME-OUT timer is reset at step 219 before the subroutine is ended.

The OVERRUN subroutine is shown in FIG. 13. Overrun should be detected when the desired position has been reached and the feedback signal has been debounced low but goes high again to indicate that brush 70 has left the contact pad. There is no overrun if the START flag is set, since a new move is just starting; and this is determined at decision point 220. A set START flag ends the subroutine. There is no overrun if the actuator position is not at the desired position, since the actuator must continue to move to the desired position; and this is determined at decision point 221. A position other than the desired position ends the subroutine. There is no overrun if the feedback signal has been debounced low and remains low. Therefore, the subroutine determines at decision point 222 if the HIDEB flag is set. A HIDEB flag not set, which indicates that the feedback signal is debounced low, ends the subroutine. A HIDEB flag set is still not sufficient to declare an overrun, since the HIDEB flag will still be set when the desired position is first detected but before the low debounce is completed, a condition in which overrun has clearly not occurred. However, the LASTFB flag is reset with the first low feedback signal at the desired position and cannot be reset until the feedback signal is debounced low. Therefore, at decision point 223, a LASTFB flag not set ends the subroutine. Although the LASTFB flag appears to be sufficient to declare overrun by itself, if might be prone to falsely declare overrun while brush 70 is on a contact pad but bounces temporarily due to dirt, etc. In such a case, with the HIDEB flag cleared (low), the LASTFB flag will alternately set and clear with the bouncing of brush 70; and an overrun could be declared when it is set. Therefore, only if both the HIDEB and LASTFB flags are both set will the subroutine declare overrun.

It is not desired, however, to flag an OVERRUN ERROR until overrun has been detected five times. Thus, the subroutine determines at decision point 224 whether an OVERRUN count is equal to 5. If it is, an OVERRUN ERROR flag is set at step 225 before the subroutine is ended. If not, the OVERRUN count is incremented at step 226 and the START flag set at step 227 for another try before the subroutine is ended.

The embodiments of the invention in which an exclusive property or privilege is claimed are defined as follows:

1. A motor vehicle suspension system having a damper with a rotatable member producing separate discrete damping characteristics in a plurality of rotational positions, a motor adapted to drive the rotatable member through the rotational positions, and position feedback apparatus comprising, in combination:
   a contact pad for each of the rotational positions of the rotatable member, the contact pads being separated by electrically insulating regions;
   an electric contact member adapted for circular movement by the motor relative to the contact pads to contact the contact pads alternately with the insulating regions with such movement, the contact member contacting one of the contact pads with the rotatable member in each of the rotational positions;
   electric circuit means connected to the contact pads and electrical contact member for generating an output voltage in a first voltage range when the electric contact member contacts any of the insulating regions and a second voltage range when the electric contact member contacts any of the contact pads;
   means for repeatedly sampling the output voltage and determining whether it is within the first voltage range or the second voltage range;
   means for selecting one of the contact pads, activating the motor to rotate the rotatable member toward the selected contact pad, and deactivating the motor when the sampled output voltage changes from the first voltage range to the second voltage range at the selected contact pad to stop rotation of the rotatable member; and
   overrun detection means responsive to a predetermined change of the sampled output voltage from the second voltage range to the first voltage range after deactivation of the motor at the selected contact pad to restart the motor so as to resume rotation of the rotatable member toward the selected contact pad.

2. The motor vehicle suspension system of claim 1 in which the overrun detection means comprises, in combination:
   first signal means activated by a first predetermined number of consecutive samples of the output voltage in the first voltage range and deactivated by a second predetermined number of samples of the output voltage in the second voltage range;
   second signal means activated by a sample of the output voltage in the first voltage range following the second predetermined number of samples of the output voltage in the second voltage range and deactivated by a sample of the output voltage in the second voltage range following the first predetermined number of consecutive samples of the output voltage in the first voltage range; and
   means for restarting the motor in response to a simultaneous activation of the first and second signal means after deactivation of the motor.

* * * * *